ARRANGEMENT COUPLING EITHER OF TWO ELECTRICAL DEVICES TO A LOAD UPON A DISTURBANCE IN THE OTHER DEVICE

Filed Jan. 16, 1948

HENDRIK NICOLAAS HANSEN
INVENTOR.
BY Fred M Vogel
AGENT.

Patented July 18, 1950

2,515,599

UNITED STATES PATENT OFFICE 2,515,599

ARRANGEMENT COUPLING EITHER OF TWO ELECTRICAL DEVICES TO A LOAD UPON A DISTURBANCE IN THE OTHER DEVICE

Hendrik Nicolaas Hansen, Eindhoven, Netherlands, assignor to Hartford National Bank and Trust Company, Hartford, Conn., as trustee Application January 16, 1948, Serial No. 2,738
In the Netherlands January 24, 1947

5 Claims. (Cl. 171—97)

This invention relates to a circuit-arrangement for coupling one of two oscillators (amplifiers) with a load on the occurrence of an interference in the other oscillator (amplifier) which is thus decoupled, and conversely.

Circuit-arrangements of this kind, in which interchanging of two oscillators or amplifiers may occur are of importance, for example for carrier-wave generators in multi-channel carrier telephone systems. Herein the carrier waves for the different channels are usually derived from one and the same carrier-wave generator, for example by frequency-multiplication. On the occurrence of an interference in this generator the operation would be completely interrupted, so that provision is usually made of a second carrier-wave generator which is adapted to replace the first.

The circuit-arrangement according to the invention exhibits the feature that the coupling of one oscillator (amplifier) by means of a relay involves decoupling of the other oscillator (amplifier) by means of a relay, a circuit being at the same time connected in parallel with part of the energising circuit of the winding effecting the decoupling, which part comprises at least the energising winding.

A relay permits a reliable and sufficiently rapid commutation, and by the parallel-connection of a circuit with the aforesaid energising circuit it is ensured that in the event of an intermittent interference occurring in the first oscillator changing over to the other oscillator occurs immediately upon the first interference, and that no further back and forth connection occurs.

In a suitable form of the circuit-arrangement according to the invention coupling of one oscillator (amplifier) is effected simultaneously with decoupling the other oscillator (amplifier) by means of a polarised relay comprising two energising windings which are separately energised.

In order that the invention may be more clearly understood and readily carried into effect, it will now be described more fully with reference to the accompanying drawing, given by way of example.

Figures 1, 2:
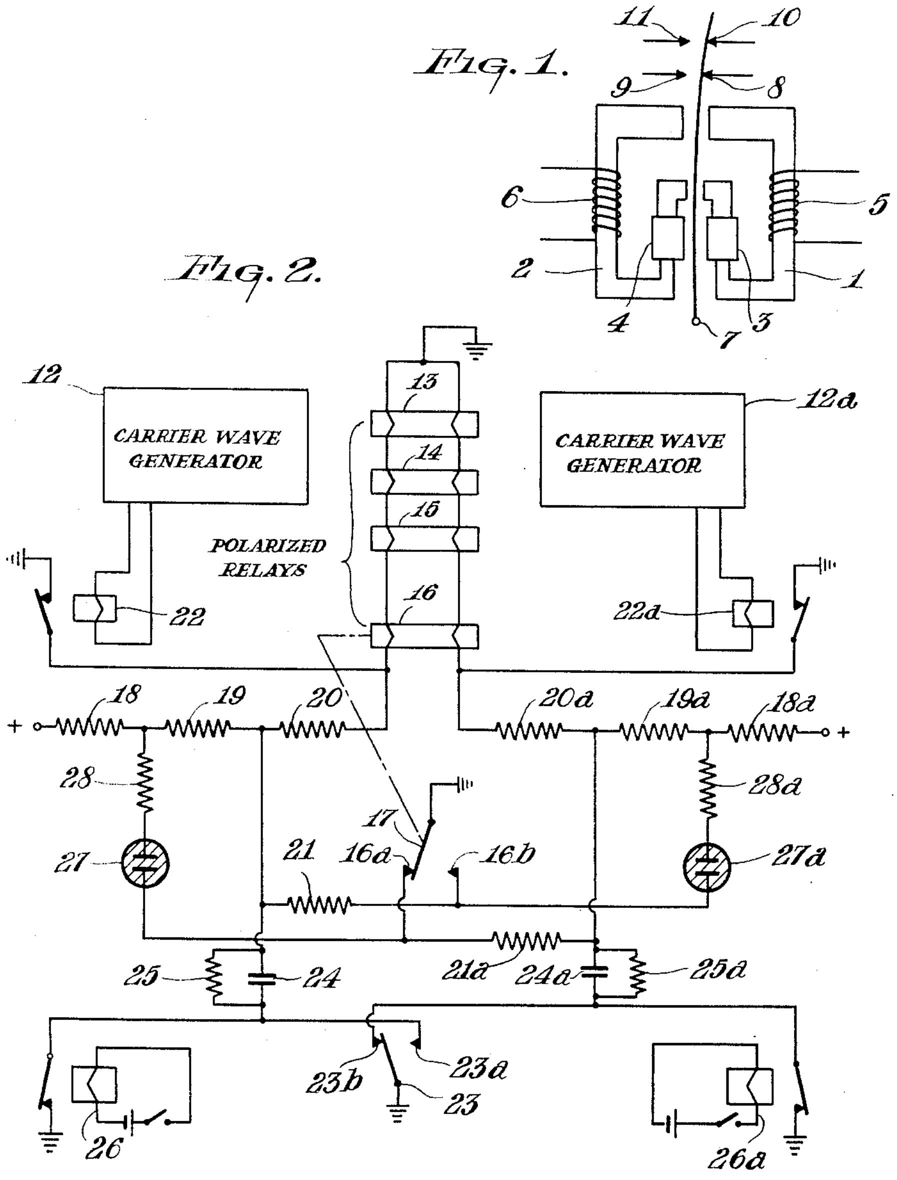
Fig. 1 shows one form of construction of a polarised relay as may be used in the present circuit-arrangement.
Fig. 2 is a schematic circuit diagram of a preferred embodiment of the invention.

As shown in Fig. 1, the polarized relay comprises two magnetic circuits 1 and 2, each comprising a permanent magnet 3 and 4 respectively having magnetic poles N and Z, each of which is adapted to be energized by a winding 5 and 6 respectively. In accordance with the relative value of the two energising currents the contact member 7 bears either on a contact 8 or a contact 9. It may be observed here that this relay has no stable central position, so that the contact member 7 either bears on the contact 8 or on the contact 9.

If the contact member 7 engages the contact 8 and if the current strength of the coil 5 drops, the contact 8 will be opened and the contact 9 closed. Provision may be made of further contacts 10 and 11 which are included in further circuits in such manner that, if the contact 8 is opened, so that the contact 11 is closed, a circuit is connected in parallel with the winding 5, so that the current through this circuit drops still further and, even upon return of the electromotive force previously operative in this energizing circuit, the current through this winding remains so low that the contacts 9 and 11 remain closed.

As appears from Fig. 2 this can also be achieved by using at least two relays, one of which serves for coupling and decoupling the two oscillators with the loads, and the other for completing and interrupting circuits connected in parallel with the energizing windings.

The circuit-arrangement shown in Fig. 2 comprises two carrier-wave generators 12 and 12*a*, each of which is adapted to be coupled with the load through three circuits with the aid of polarised relays 13, 14 and 15. In addition, provision is made of a polarised relay 16, the contact member of which is designated 17 and the contact points 16*a* and 16*b*.

The left-hand windings of the relays 13, 14, 15 and 16 are interconnected in series and are fed from a direct current supply through the series-connection of resistances 18, 19 and 20, the right-hand windings being likewise connected in series and fed through resistances 18*a*, 19*a* and 20*a*.

If the generator 12 is coupled with the load, the contact members of all relays occupy a position corresponding to that shown at 18. In this event a resistance 21*a* is connected in parallel with the series-connection of the right-hand windings of the relays and the resistance 20*a*, so that the energising current through the right-hand windings is much lower than that through the left-hand windings, and the relays are consequently locked in the position occupied by them.

On the occurrence of an interference in the generator 12, which may, for example, cause a decrease in amplitude of the oscillation produced, the contact of relay 22 is closed, as a result of which the left-hand windings of the relays 13, 14, 15 and 16 are short-circuited so that these relays commutate, the generator 12*a* thus being connected to the load and at the same time a parallel-connection of the resistance 21 with the series-connection of the resistance 20 and the left-hand windings of the relays being established through the contact 16*b*. If the interference in the generator 12 is only of short duration, the relay 22 is de-energised but, owing to the said parallel-connection, the current strength in the left-hand windings of the relays is only low, so that no commutation to the generator 12 can occur and annoying back and forth commutation of the relays is avoided. It is pointed out that each of the generators may comprise more than one safety relay 22. Thus, for example, there may be provided one which responds to frequency divergences.

If an interference occurs in the operating generator 12*a*, the generator 12 is connected to the loads in an analogous manner.

In addition, the circuit-arrangement comprises means for manual commutation from one generator to the other with the aid of switch 23.

If the relays 13, 14, 15 and 16 occupy a position corresponding to that of the contact spring 17, in which consequently the generator 12 is commutated, and if the contact 23*a* is earthed with the aid of the switch 23, a strong charging current flows for a short time through the condenser 24, so that the left-hand windings of the relays 13, 14, 15 and 16 are traversed only by a very low current and commutation occurs. If, subsequently, an interference occurs in the generator 12*a*, changing over to the generator 12 occurs, since the resistance 25 which only serves to discharge the condenser 24, has a very high value, so that, if the contact 23*a* is earthed, the current strength through the resistance 25 is negligible and does not exert any influence on the commutation of the polarised relays.

If an interference occurs in the generator 12*a* and if commutation from the generator 12 to the generator 12*a* occurs with the aid of the switch 23*a*, no changing over occurs, since the right-hand windings of the relays 13, 14, 15 and 16 are short-circuited, whereas the left-hand windings are still traversed by a small current.

Commutation as performed by means of the switch 23 may also be effected by means of the relays 26 and 26*a*, by which a circuit comprising the condenser 24 and the resistance 25 and 24*a*, 25*a* respectively is likewise connected in parallel.

If, for example, the generator 12 is operative and the frequency of this generator proves not to fulfil the requirements imposed, this generator may be decoupled and the generator 12*a* coupled by closing the contact 26. If a serious interference subsequently occurs therein, so that the relay 22 is energised, changing back to the generator 12 occurs, by means of which the operation may proceed, though not perfectly.

Moreover, the circuit-arrangement comprises gas discharge tubes 27 and 27*a*, which serve as signal lamps and the consumption of which is small as compared with other current values occurring in the arrangement, and series-resistances 28 and 28*a*, which lamps show the position of the switch 17 and consequently which generator is connected to the load.

Figure 3:
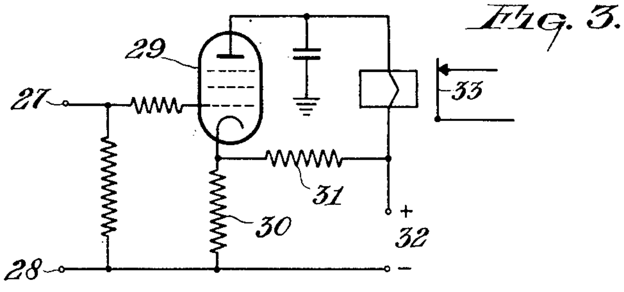
Fig. 3 is a schematic circuit diagram of a modification of the embodiment in Fig. 2.

For clearness' sake Fig. 3 shows one form of construction of a relay arrangement which may, for instance, be used for the relays 22 or 22*a* shown in Fig. 2.

To the input terminals 27 and 28 of the grid-circuit of a discharge tube 29 an alternating voltage is fed which is taken from the generator and should exceed a given critical value.

With the aid of resistances 30 and 31 and the voltage of battery 32 the tube is adjusted in such manner that in the absence of a signal between the terminals 27 and 28 (B-setting) no anode current flows. In this event the switch 33 is closed. If a sufficiently high alternating voltage is fed to the input terminals, anode rectification takes place and the switch 33 opens.

What I claim is:

1. An arrangement for coupling either one of two electrical devices to a load on the occurrence of a disturbance in the other device comprising a polarized relay provided with first and second magnetic windings, separate circuits for applying energizing voltages to said first and second windings, said relay being arranged upon energization of said first winding to connect said load to one of said devices whereby the other of said devices is decoupled from said load and upon energization of said second winding to connect said load to the other of said devices whereby said one of said devices is decoupled from said load, means responsive to a disturbance in said one of said devices to shunt said first windings to prevent energization thereof, means responsive to a disturbance in said other of said devices to shunt said second winding to prevent energization thereof.

2. An arrangement for coupling either one of two electrical devices to a load on the occurrence of a disturbance in the other device comprising a first polarized relay provided with first and second magnetic windings, separate circuits for applying energizing voltages to said first and second windings, said relay being arranged upon energization of said first winding to connect said load to one of said devices whereby the other of said devices is decoupled from said load and upon energization of said second winding to connect said load to the other of said devices whereby said one of said devices is decoupled from said load, a second polarized relay having first and second magnetic windings, said second relay being arranged upon energization of the first winding thereof to shunt the first winding of said first relay to prevent energization thereof, said second relay being arranged upon energization of the second winding thereof to shunt the second winding of said first relay to prevent energization thereof, means responsive to a disturbance of said first device to energize the first winding of said second relay, and means responsive to a disturbance in said second device to energize the second winding of said second relay.

3. An arrangement for coupling either one of two electrical devices to a load on the occurrence of a disturbance in the other device comprising a polarized relay provided with first and second magnetic windings, a source of energizing potential for said first and second windings, first and second resistance elements, said source being connected through said first and second resistance elements to said first and second windings respectively, first and second resistors, said relay being arranged upon energization of said first winding to connect said load to said first device and to connect said first resistor across said second winding in series with a portion of said second resistance element to reduce the potential impressed on said second winding, said relay being arranged upon energization of said second winding to connect said load to said second device and to connect said second resistor across said first winding in series with a portion of said first resistance element to reduce the potential across said first winding, means responsive to a disturbance in said one of said devices to shunt said first winding to prevent energization thereof, and means responsive to a disturbance in said other of said devices to shunt said second winding to prevent energization thereof.

4. An arrangement as set forth in claim 3 wherein said means responsive to a disturbance in said one of said devices and said means responsive to a disturbance in said other of said devices comprises a second polarized relay having a first winding coupled to said one of said devices and a second winding coupled to the other of said devices, said second relay being arranged upon energization of said first winding by a disturbance in said one of said devices to shunt the first winding in the first relay and upon energization of said second winding by a disturbance in said other of said devices to shunt the second winding of said first relay.

5. An arrangement as set forth in claim 3 further including a pair of resistance capacitance-parallel networks, and selective means for connecting each of said networks across a respective first and second resistors.

HENDRIK NICOLAAS HANSEN.

REFERENCES CITED

The following references are of record in the file of this patent:

FOREIGN PATENTS

| Number | Country | Date |
|---|---|---|
| 484,287 | Great Britain | May 3, 1938 |